United States Patent [19]

Frund

[11] Patent Number: 5,699,422

[45] Date of Patent: Dec. 16, 1997

[54] TELECOMMUNICATION DEVICE

[75] Inventor: Jean Daniel Frund, Saint Julien en Genevais, France

[73] Assignee: Motorola, Inc., Schaumburg

[21] Appl. No.: 389,380

[22] Filed: Feb. 16, 1995

[30] Foreign Application Priority Data

Feb. 23, 1994 [GB] United Kingdom ............... 9403426.1

[51] Int. Cl.$^6$ ............................................. H04M 19/00
[52] U.S. Cl. ........................ 379/387; 379/373; 379/377; 379/413
[58] Field of Search ........................ 379/229, 339, 379/387, 377, 82, 373, 375, 399, 413; 323/312, 314, 315

[56] References Cited

U.S. PATENT DOCUMENTS

| | | | |
|---|---|---|---|
| 3,958,086 | 5/1976 | Calcagno et al. | 379/229 |
| 3,974,342 | 8/1976 | Wagner | 39/183 |
| 4,287,392 | 9/1981 | Melindo | 379/339 |
| 4,319,181 | 3/1982 | Wrathall | 323/315 |
| 4,417,099 | 11/1983 | Pierce | 379/98 |
| 4,803,719 | 2/1989 | Ulrich | 379/399 |
| 5,134,403 | 7/1992 | Rush | 341/159 |
| 5,262,713 | 11/1993 | Agiman | 323/315 |
| 5,325,427 | 6/1994 | Dighe | 379/386 |
| 5,500,894 | 3/1996 | Hershbarger | 379/399 |

FOREIGN PATENT DOCUMENTS

| | | | |
|---|---|---|---|
| 0560246 | 9/1993 | European Pat. Off. | H04M 1/60 |
| 2231467 | 11/1990 | United Kingdom | H04M 11/06 |
| 9112682 | 8/1991 | WIPO | H04M 1/00 |

*Primary Examiner*—Krista M. Zele
*Assistant Examiner*—Jacques M. Saint-Surin
*Attorney, Agent, or Firm*—Harry A. Wolin; Rennie William Dover; Robert D. Atkins

[57] ABSTRACT

A telecommunications device (10) includes an input terminal (12,13) for coupling to an input line of a telecommunications network. A detection arrangement (17, 18, 23) is coupled to the input terminal (12,13) for providing an output voltage in response to a voltage on the input line exceeding a threshold level. An output terminal (21) is coupled to receive the output voltage from the detection arrangement (17, 18). The detection arrangement (17, 18) includes a control arrangement (17) for setting the threshold level in response to a received control signal (19).

7 Claims, 1 Drawing Sheet

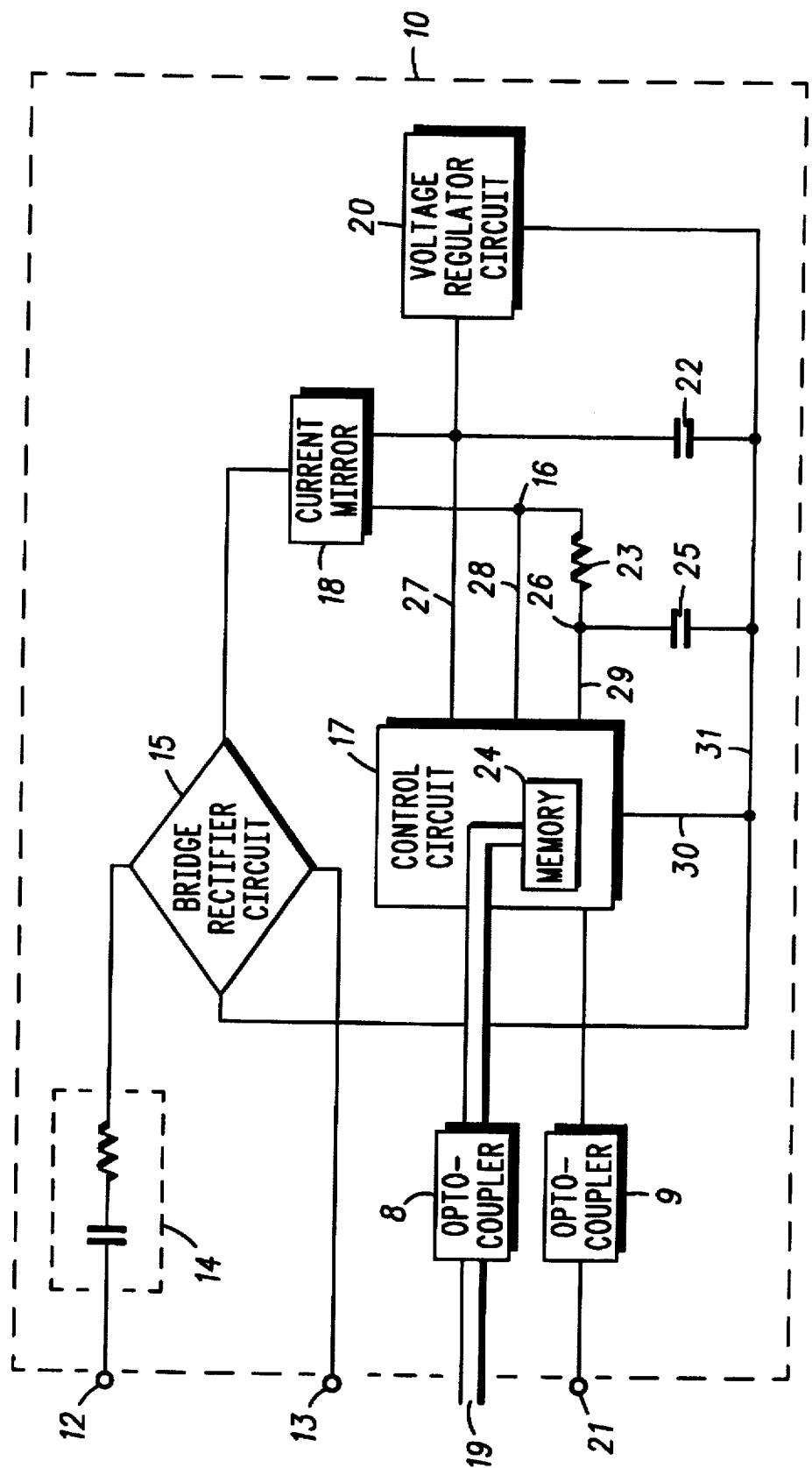

TELECOMMUNICATION DEVICE

FIELD OF THE INVENTION

According to the present invention there is provided a telecommunications device comprising an input terminal for coupling to a telecommunications network. A detection means detect an AC current from the input terminal and uses the AC current from the input terminal to provide power for the telecommunications device. A deriving means derives a voltage from the detected AC current. A control means is coupled to receive the voltage from the deriving means and for selecting a threshold level in response to a received control signal. The control means includes means for comparing the derived voltage with the selected threshold level and for providing an output signal indicative of a ringing input signal from the telecommunications network if the derived voltage exceeds the selected threshold level.

This invention relates generally to telecommunications devices.

BACKGROUND OF THE INVENTION

Within a telecommunications network such as a telephone system, a call to a connected telecommunications device is typically signalled by a voltage generated by a control station of the network and applied via an input line to the device. The device is arranged to detect a call when the voltage on the input line exceeds a threshold voltage level set in the device, the level being the voltage generated by the control station of the network.

A number of threshold voltages and associated frequencies are used in different networks. The device for use with one network is set with a threshold voltage level and frequency response suitable for that network.

A problem with this arrangement is that functionality may not be maintained if a device suitable for one network is connected to another network, because the threshold voltage and/or frequency characteristics corresponding to a call for that network may differ greatly from those set within the device.

Furthermore, telecommunications device manufacturers currently have to produce specific models for specific networks, which is an inefficient use of manufacturing resources.

This invention seeks to provide a telecommunications device in which the above mentioned disadvantages are mitigated.

SUMMARY OF THE INVENTION

The control means preferably comprises storage means for storing a plurality of predetermined threshold levels.

The device is preferably arranged to be powered from the input terminal, preferably by way of a current mirror coupled to the input terminal for dividing the current drawn from the input line into two portions, a first portion being converted to the derived voltage for sampling by the control means and a second portion for providing power for the device.

The device preferably further comprises isolation means for electrically isolating the device from a further device to which it is coupled. The isolation means are preferably optocouplers.

The deriving means preferably comprises resistive and capacitive elements. Preferably the resistive and capacitive elements also provide frequency compensation such that the response of the device is substantially independent of frequency of the current drawn from the input line.

In this way functionality of the device is possible with a plurality of networks, and a single device may be manufactured for use with more than one network.

BRIEF DESCRIPTION OF THE DRAWINGS

An exemplary embodiment of the invention will now be described with reference to the single FIGURE which shows a preferred embodiment of a telecommunications device in accordance with the invention.

DETAILED DESCRIPTION OF A PREFERRED EMBODIMENT

Referring to the single FIGURE, there is shown a telecommunications device 10, typically a ring detector circuit, comprising line input terminals 12 and 13 which provide dual connections to a conventional two wire (tip and ring) line of a telecommunications network (not shown).

A bridge rectifier circuit 15 is coupled to receive an A.C. ringing current from the line input terminals 12 and 13, and provides an A.C. rectified current indicative of the A.C. ringing current from the two wire line.

A line impedance circuit 14, coupled between the line input terminal 12 and the bridge rectifier circuit 15 provides capacitance and impedance values suitable for the two wire line.

A current mirror 18 is coupled to receive the rectified A.C. current from the bridge rectifier circuit 15, for dividing the current into two portions: a first portion being a first divided current provided at a first current path to a first node 16 and a second portion being a remaining divided current, provided to one terminal of a reservoir capacitor 22. A further terminal of the reservoir capacitor 22 is coupled to a return current path 31, which is coupled to the bridge rectifier circuit 15 and is hence an effective ground.

A voltage regulator circuit 20 is coupled to each side of the reservoir capacitor 22, for regulating the voltage thereacross.

A control circuit 17 is coupled to receive an operating current from the reservoir capacitor 22 via an input 27. The control circuit 17 also has an input 28 coupled via the first node 16 to the first current path of the current mirror 18, an input 29 coupled to a second node 26, and an input 30 coupled to the current return path 31. The control circuit 17 includes a memory 24, containing a number of threshold voltage values to be explained hereafter.

A resistor 23 is coupled between the first node 16 and the second node 26. The second node 26 is further coupled to the return path 31 through a capacitor 25.

The values of the resistor 23 and the capacitor 25 are arranged such that in combination with the line impedance circuit 14, they form a potential divider circuit, with the first node 16 being the point of divided potential. They are furthermore arranged to render the device substantially independent of frequency of the A.C. ringing current on the two wire line.

A control input terminal 19 is coupled to the control circuit 17 for providing thereto a control signal received from an external control device, such as a microprocessor or switches. The external control device produces the control signal which indicates the threshold voltage value to be selected from the memory 24.

The coupling between the control input terminal 19 and the memory 24 will typically be implemented with a multiple wire arrangement, as shown in the drawing.

An output terminal 21 is coupled to receive an output signal from the control circuit 17, for providing the output signal to a connected user device, such as a modem.

For electrical isolation, the connections to the input terminal 19 and the output terminal 21 are made with optocouplers 8 and 9.

As previously mentioned, a number of threshold voltage values are stored in the memory 24. These are proportional to various threshold voltages used within telecommunications networks to indicate a ringing signal.

A prior art communications device is arranged to detect a call when the voltage on the input line exceeds a single threshold voltage value permanently set during manufacture of the device, the level being the voltage known to be generated by the control station of the network to indicate a call.

In operation of the device 10, the external control device coupled to the input terminal 19 provides the control signal thereto, the control signal indicating the threshold value to be selected from the memory 24. The external control device derives the control signal from received information about the network to which the device 10 is connected.

A call to the telecommunications device 10 is signalled by the A.C. ringing current generated by a control station of the telecommunications network and applied via the input terminals 12 and 13. The A.C. ringing current is rectified by the bridge rectifier circuit 15 to provide the rectified A.C. current to the current mirror 18.

The current mirror 18 divides the rectified current into the two portions, providing the first divided current at the first current path to the first node 16, and providing the remaining divided current to the reservoir capacitor 22, which is thereby charged. The discharging reservoir capacitor 22 provides operating power to the control circuit 17 by way of input 27. The control circuit 17 is thus switched on and selects the voltage threshold value indicated by the received control signal, from the memory 24.

The control circuit 17 then compares the voltage at the point of divided potential (the node 16) with the selected threshold value. However, because the A.C. ringing current has been rectified by the bridge rectifier circuit 15, a simple constant measurement across the resistor 23 and the capacitor 25 would produce an erroneous value.

Therefore the measurement must be sampled by the control circuit 17. Thus the first current which flows through the resistor 23 and the capacitor 25 develops a voltage $V_1$ across the resistor 23 and a voltage $V_2$ across the capacitor 25. The control circuit 17 monitors $V_1$ and each time it reaches a predetermined value (permanently set in the control circuit 17), an internal clock signal is generated. For exactly one half of each internal clock signal, the voltage $V_2$ across the capacitor 25 is measured by the control circuit 17.

The second node 26 is then grounded by the control circuit 17 via the input 29, thereby discharging the capacitor 25 before the next clock signal occurs.

In this way a voltage $V_3$, found by measuring the combined voltage across the resistor 23 ($V_1$) and the capacitor 25 ($V_2$) correctly indicates a constant value proportional to an RMS value of the A.C. ringing current at the line input terminals 12 and 13. $V_3$ is proportional because of the division of the A.C. rectified current by the current mirror 18 and the further division by the potential divider arrangement. Therefore the threshold voltage levels stored in the memory 24 of the control circuit 17 are also proportional to the actual threshold voltage levels of the various telecommunications networks which they represent.

$V_3$ is compared to the set threshold level by the control circuit 17, which generates the output voltage to the output terminal if the voltage $V_3$ exceeds the set threshold level.

The circuit may be coupled to any conventional telecommunications network, including national telephone networks, and functionality with the connected network is maintained, regardless of the A.C. ringing current magnitude or frequency.

Furthermore, the device 10 is entirely powered by the A.C. ringing current and is electrically isolated from the user device.

It will be appreciated by a person skilled in the art that alternative embodiments to the one described are possible.

For example, the control signal could be arranged to provide the threshold value directly, rather than selecting a value from the memory 24.

Furthermore, alternative isolating arrangements to the optocouplers described above could be used, such as relay arrangements or switches.

I claim:

1. A teleccmmunioations device comprising:
   an input terminal for coupling to a telecommunications network;
   detection means for detouring an AC current from the input terminal and using the AC current from the input terminal to provide power for the telecommunciations device;
   deriving means for deriving a voltage from the detected AC current; and
   control means coupled no receive the voltage from the deriving means and for selecting a threshold level in response to a received control signal, wherein the control means includes means for comparing the derived voltage with the selected threshold level and for providing an output signal indicative of a ringing input signal from the telecommunications network if the derived voltage exceeds the selected threshold level.

2. The device of claim 1 wherein the control means comprises storage means for storing a pulurality of predetermined threshold levels.

3. The device of claim 1 further comprising a current mirror coupled to the input terminal for dividing the current from the input line into two portions, a first portion being converted to the derived voltage for sampling by the control means and a second portion for providing power for the device.

4. The device of claim 1 further comprising isolation means for electrically isolating the device from a further device to which it is coupled.

5. The device of claim 4 wherein the isolation means are optocouplers.

6. The device of claim 1 wherein the deriving means comprises resistive and capacitive elements.

7. The device of claim 6 wherein the capacitive elements also provide frequency compensation such that the response of the device is substantially independent of frequency of the current drawn from the input line.

\* \* \* \* \*

UNITED STATES PATENT AND TRADEMARK OFFICE
CERTIFICATE OF CORRECTION

PATENT NO. : 5,699,422

DATED : December 16, 1997

INVENTOR(S) : Jean Daniel Frund

It is certified that error appears in the above-identified patent and that said Letters Patent is hereby corrected as shown below:

In claim 1, column 4, line 24, delete "teleccmmuniotions" and replace with -- telecommunications --.

In claim 1, column 4, line 27, delete "detouring" and replace with -- detecting --.

In claim 1, column 4, line 33, delete "no" and replace with -- to --.

Signed and Sealed this

Fourteenth Day of September, 1999

Attest:

Q. TODD DICKINSON

*Attesting Officer*           *Acting Commissioner of Patents and Trademarks*